Feb. 3, 1959

C. W. DOEPKE ET AL 2,872,058

DISPENSING MECHANISM

Filed Jan. 5, 1956

INVENTORS.
Charles Wm. Doepke.
BY Blaine S. Aston.
Wood, Herron & Evans.
ATTORNEYS.

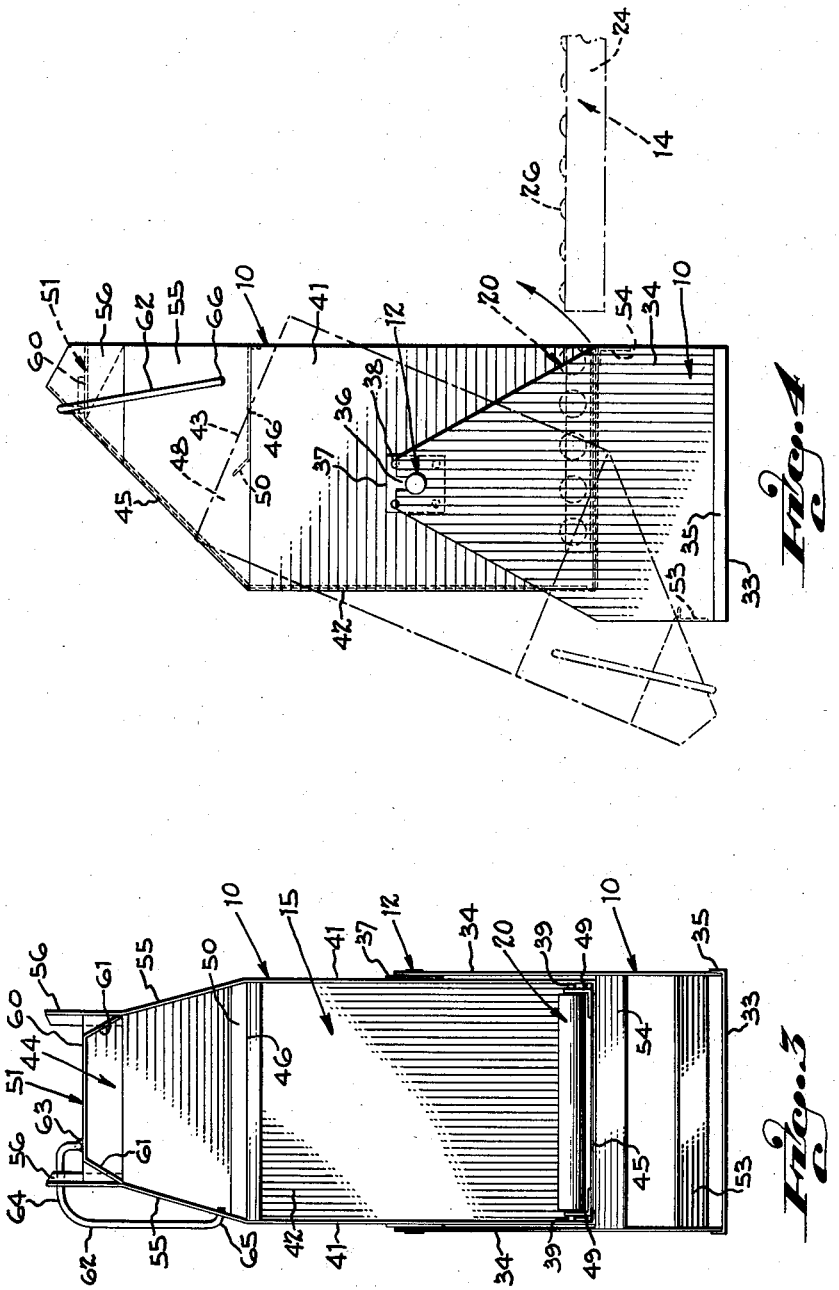

Feb. 3, 1959

C. W. DOEPKE ET AL 2,872,058

DISPENSING MECHANISM

Filed Jan. 5, 1956

INVENTORS.
Charles Wm. Doepke.
BY Blaine S. Aston.
Wood, Herron & Evans.
ATTORNEYS.

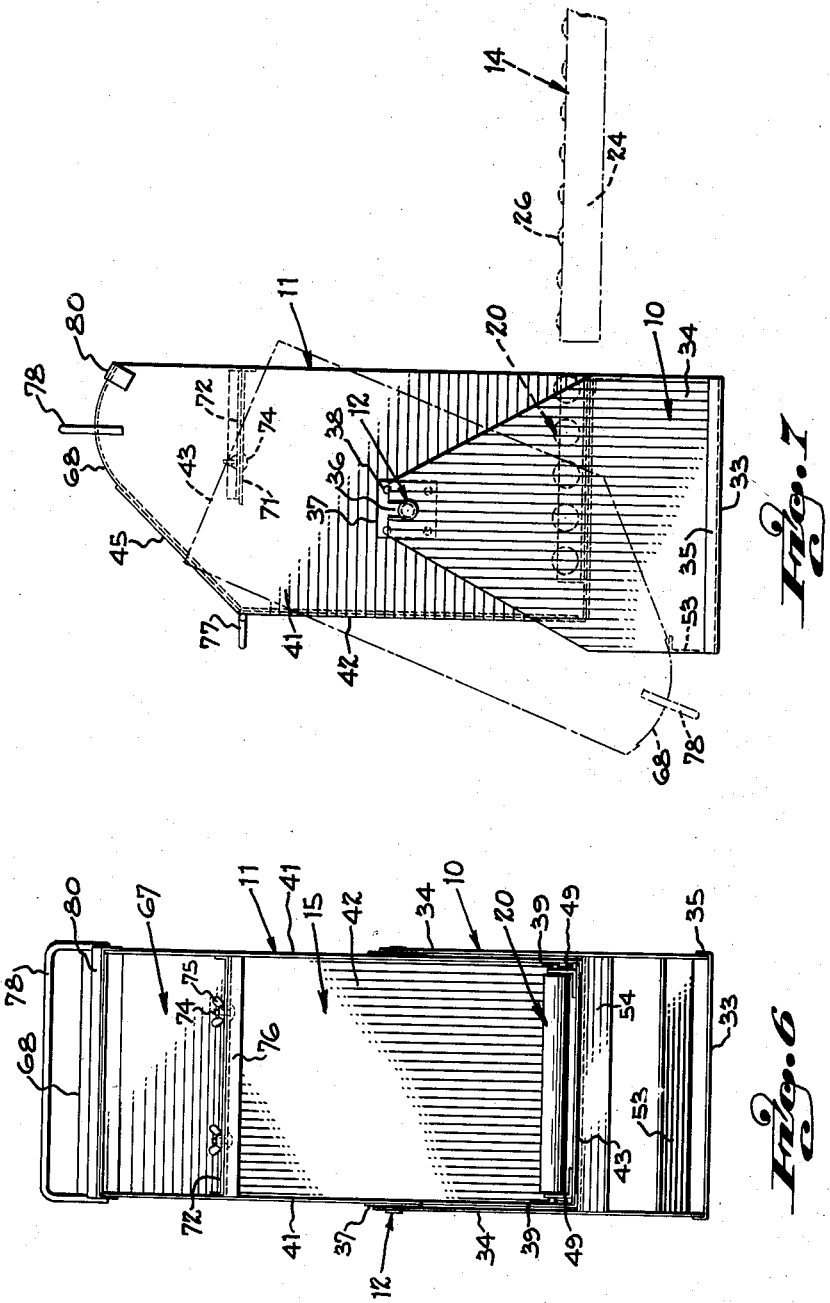

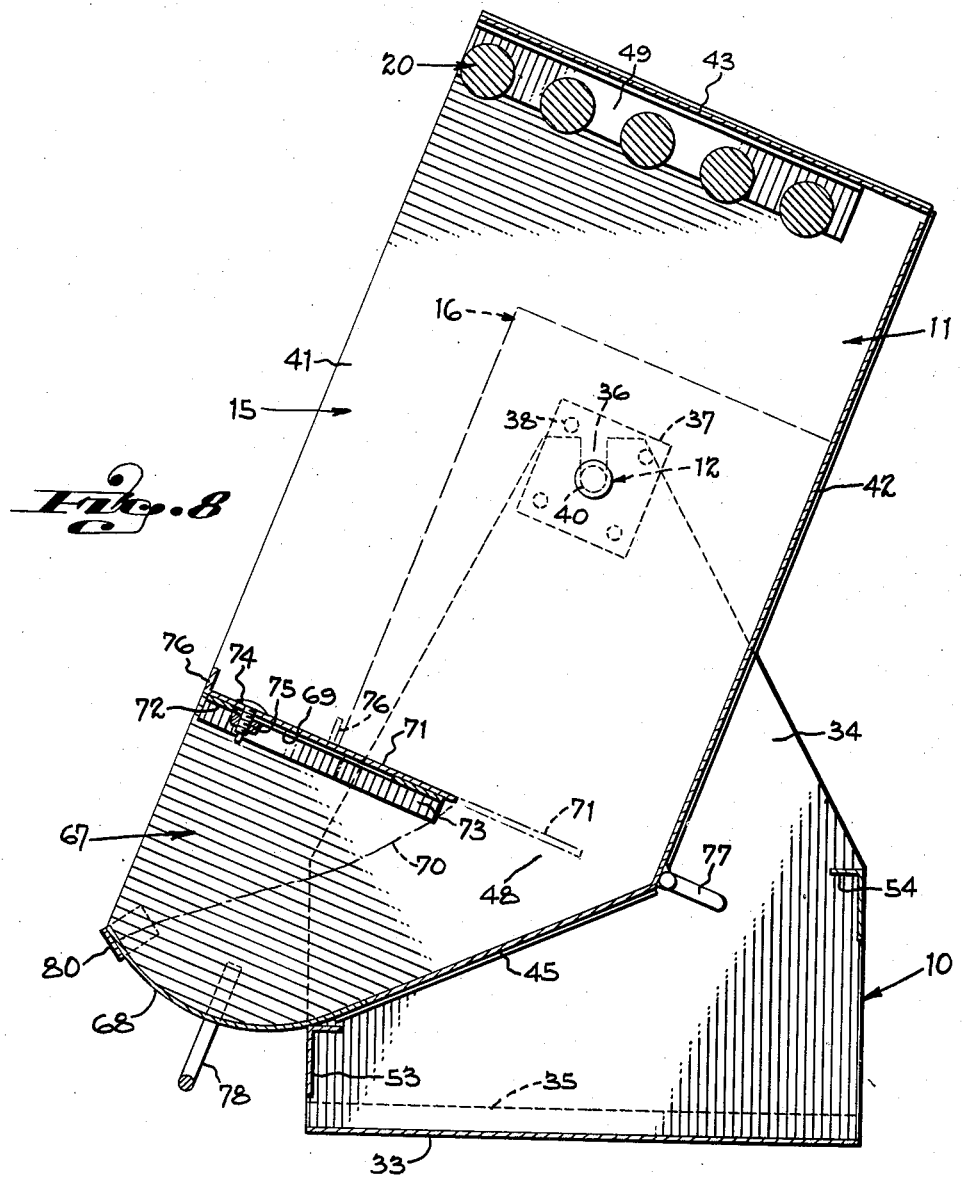

United States Patent Office

2,872,058
Patented Feb. 3, 1959

2,872,058

DISPENSING MECHANISM

Charles W. Doepke and Blaine S. Aston, Cincinnati, Ohio, assignors, by mesne assignments, to Nestier Corporation, Cincinnati, Ohio, a corporation of Ohio Application January 5, 1956, Serial No. 557,480

6 Claims. (Cl. 214—314)

This invention relates to a dispensing mechanism for the controlled delivery of metal parts such as bolts, nuts, washers, and the like, which are used in large quantities in industrial plants.

Relatively small parts of this general nature are used most extensively in the assembly of products along an assembly line or bench, where the workers require a supply of the parts in assorted sizes and kinds. In such operations, it is customary to keep the assemblers supplied with one or several receptacles, each containing parts of a given size or type according to his needs. As the parts are used up, the empty receptacles are replaced with full ones by someone having this responsibility, the empty receptacles being refilled from bulk supplies of the various parts.

The parts usually are shipped to the plant packed in fairly large bulk containers, such as boxes, cartons, or kegs. The bulk containers full of metal parts are quite heavy and difficult to handle. Moreover, since a power crane or hoist is usually available in the plant, a great deal of manual effort and time can be saved by utilizing the hoist in handling the bulk containers.

It is therefore a primary object of this invention to provide a dispensing mechanism so arranged that the bulk containers may be lifted by power to a delivery position, such that the parts may be poured by gravity directly into the individual receptacles, thus eliminating the time and effort of manual handling.

The present dispensing mechanism includes a roll-over hopper which follows the concept disclosed in the prior application of Charles W. Doepke et al., Serial No. 413,583, now Patent No. 2,755,001; however, the present mechanism carries forward the principles disclosed therein. The dispenser of the prior application includes a hopper pivotally mounted within a base and arranged, when in upright position, to receive a bulk container of parts, thereafter to be pivoted to an inverted dispensing position. In dispensing position, the parts are caused to flow from the inverted container to an open delivery chute where they are dipped out by the workers as needed.

A more specific object of the present invention has been to provide a dispensing mechanism of this general nature, combined with a storage conveyor, so arranged that several bulk containers of parts may be hoisted by power to the conveyor for storage, advanced individually along the conveyor into the hopper, then inverted by pivoting the roll-over hopper to its inverted dispensing position, whereby the hopper may be loaded rapidly with little or no manual effort.

A further object has been to provide a manually operated feed control mechanism adapting the parts to flow by gravity from the delivery spout of the inverted hopper to enable the worker conveniently and quickly to fill individual receptacles without spilling the parts. In this aspect, the dispenser may be used as a central supply for filling individual parts receptacles to be distributed throughout the plant where needed.

According to the present concept, the dispenser hopper is mounted in an elevated position upon a frame work at a convenient height for filling the individual parts receptacles. To eliminate the effort of lifting and handling the heavy bulk containers by hand, a generally horizontal storage conveyor extends from the open loading side of the hopper. One end of the hopper includes a delivery spout and its opposite end has a series of conveyor rollers. When in upright loading position, the conveyor rollers of the hopper reside generally flush with an end of the storage conveyor and form an endwise continuation of it. Consequently, a number of bulk parts containers may be elevated by the power hoist to the elevated storage conveyor; thereafter, the open containers are advanced with very little effort along the storage conveyor, through an open face of the hopper directly upon the rollers within the hopper. The hopper then may be rotated with little effort to its inverted discharge position, whereupon the parts flow by gravity from the open, upended container to the delivery spout.

The hopper is poised partially in balanced condition after the container is advanced into it; therefore, the structure substantially eliminates manual effort in turning the hopper to the inverted discharge position. The storage conveyor preferably is of the anti-friction roller type which allows the bulk containers to be advanced manually to the hopper with little effort; consequently, the hopper may be reloaded with a full container each time it is exhausted.

The feed control mechanism consists of a flow regulating gate pivotally mounted at the open discharge end of the hopper spout and includes a hand lever for swinging the gate from an upwardly inclined closed position to a downwardly inclined feeding position. In the feeding position of the gate, the parts flow by gravity from the bulk container down the spout (which is inclined downwardly when the hopper is inverted) and across the control gate, while the rate of flow is regulated by shifting the lever to vary the downward inclination of the gate. This arrangement allows the parts to flow by gravity into the individual receptacles and allows the operator to decrease and finally stop the flow as the receptacle is filled. In its upwardly inclined closed position, the gate acts as a barrier to block the flow but the parts, however, are presented in an exposed position in the open spout and may be dipped out by hand if desired.

The present application includes a modified structure including the storage conveyor principle for convenience in advancing and loading the parts containers into the hopper. In the modified structure, the parts flow from the inverted container to a retaining chute where they are dipped out as distinguished by the gravity flow provided by the feed control mechanism. The modified hopper includes a variable flow control plate which delineates a delivery opening leading from the open end of the parts container to the retaining chute. Adjustment of the flow control plate governs the angle of repose of the parts within the retaining chute, thereby to prevent overflow of parts from it; the adjustment of the control plate is dictated by the size or other qualities of the parts which effect their flowability. The modified structure may be utilized to deliver parts directly at the assembly station and is intended particularly for parts which, because of greater size, are not distributed in the individual receptacles.

Various other features and advantages of the invention are disclosed in the specification in conjunction with the drawings.

In the drawings:

Figure 3 is a vertical elevation of the dispenser, looking toward its open loading side, with its hopper in upright loading position.

Figure 4 is a side elevation of the dispenser as projected from Figure 3.

Figure 6 is a vertical elevation, similar to Figure 3, showing the modified version of the dispenser.

Figure 7 is a side elevation projected from Figure 6.

Figure 8 is an enlarged sectional view showing the modified structure in its inverted position.

*General arrangement*

Figure 1:
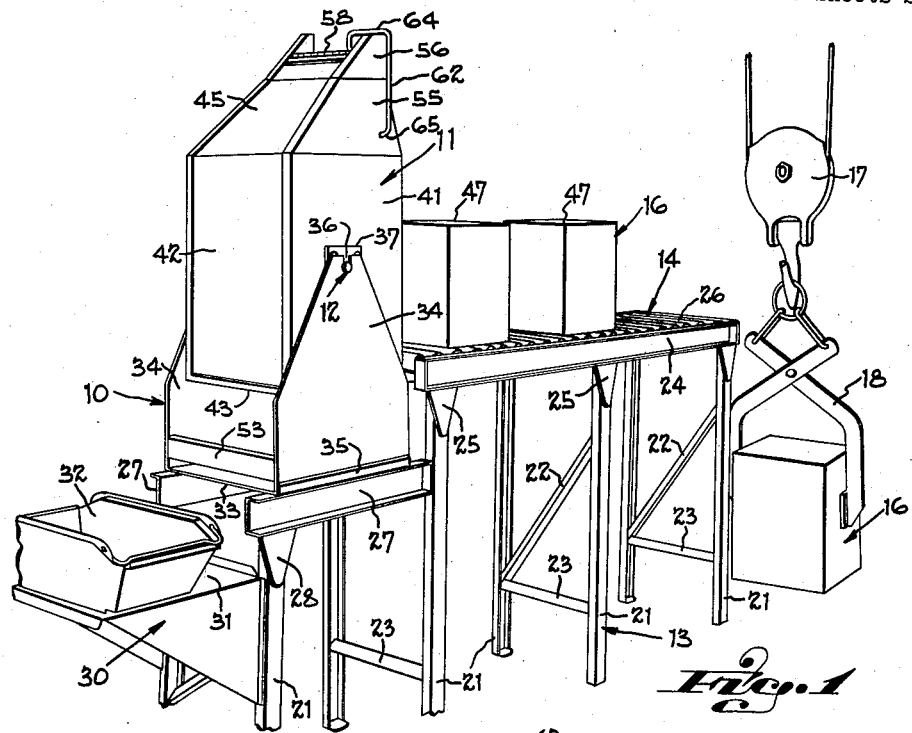
Figure 1 is a general perspective view showing the dispensing mechanism with the hopper in upright loading position.

Described with reference to Figures 1 and 2, the dispenser comprises a base, generally indicated at 10, and the roll-over hopper 11 pivotally mounted upon the base by trunnions 12. In its loading position shown in Figure 1, the hopper assumes the upright position and, after being loaded, the hopper is rotated upon its trunnions 12 to the inclined dispensing position shown in Figure 2. The base and hopper so far described are generally similar to the dispenser shown in the aforesaid copending application. The dispenser is mounted upon a frame work 13 including a loading conveyor 14. This structure facilitates loading the dispenser and supports it at a height most convenient for use.

The loading conveyor 14, preferably of the roller type, is mounted in a horizontal plane and extends rearwardly from the open loading side 15 of the hopper. The parts containers 16 are quite heavy and may be elevated to the conveyor 14 by a hoist 17 having a cramping tongs 18 for frictionally gripping and elevating the containers to the loading conveyor. After being placed on the conveyor and released by the tongs, the containers are conveniently pushed by hand into the hopper 11 when it is in the upright loading position of Figure 1. Thereafter, the hopper is pivoted manually with very little effort to the inverted dispensing position of Figure 2. For advancing the containers or boxes 16 into the hopper, the bottom of the hopper includes conveyor rollers 20 which, when the hopper is in upright loading position (Figure 4), reside in the plane of the loading conveyor 14 and forms an endwise extension of it, such that the boxes require no lifting or other manipulation.

The loading conveyor 14 preferably is mounted in a level plane so that the containers or boxes 16 do not tend to roll by gravity in either direction. It has sufficient length to store a sufficient number of containers for one or more days of operation. The tops of the containers may be removed either before or after they are hoisted to the loading conveyor; it is preferable to store them in open condition so that they are ready to be advanced to the hopper as needed. When the container in the hopper is emptied, the hopper is pivoted back to its loading position, the empty container is removed from it, then the full container is advanced into the upright hopper. It will be understood that an individual dispensing mechanism is utilized for each different size or variety of parts and that they may be installed in batteries to be served by a single hoist.

The frame work 13 preferably is formed of structural steel members joined by welding and comprises legs 21, diagonal braces 22, and horizontal spacers 23 near the lower ends of the legs. The loading conveyor 14 consists of horizontal side rails 24—24 including brackets 25 secured to the upper end portions of the legs 21 of the frame work. The conveyor rollers 26 extend transversely between the side rails and are journalled between them, preferably by anti-friction bearings in the usual way. The loading conveyor is of conventional design and the details of its construction have been omitted.

The base 10 of the dispenser is supported upon a pair of horizontal channel irons 27—27 projecting forwardly from the conveyor and located below the plane of the conveyor to sustain the hopper rollers 20 in the plane of the conveyor as indicated in Figure 4. The channel irons 27 include brackets 28 connecting the forward legs 21 of the frame to the channel irons for support.

At its forward end, frame 13 includes a receptacle support table 30 formed of sheet metal and extending in cantilever fashion from the end of the frame. The top 31 of the table resides below the base 10 of the dispenser so as to support the parts receptacle 32 for convenient gravity filling, as shown in Figure 2. The receptacle 32 is of the type disclosed in the prior application of Charles Doepke, et al., Serial No. 413,194 to which attention is invited. It will be understood however, that the dispenser mechanism is not restricted to the use of this receptacle.

*Dispenser structure*

As viewed in Figure 3, the base 10 is generally U-shaped and is fabricated from heavy gauge sheet metal consisting of a bottom plate 33 and spaced side plates 34—34 rising vertically from the base. The bottom plate may be pierced for permanent attachment to the channel irons 27 upon which it rests. The bottom plate 33 is flanged as at 35 along opposite side edges and the side plates 34 preferably are welded to the flanges. As viewed in Figure 4, the side plates 34 converge upwardly in triangle fashion and each upper portion includes an open slot 36 in which the trunnions 12 are rotatably journalled.

Each trunnion 12 consists of a pivot pin welded to a mounting pad 37 which, in turn, is secured by screws 38 to the hopper 11 on opposite sides. The projecting portion of each pivot pin includes a groove 40 (Figure 5) intermediate the length of the pin. The diameter of the groove corresponds to the width of slot 36 so as to lock the pivot pins against the lengthwise motion and to center the hopper 11 between the side plates 34 of the base. The pivot pins 12 reside along a common axis and support the hopper in cradled position between the side plates 34 of the base.

Figure 5:
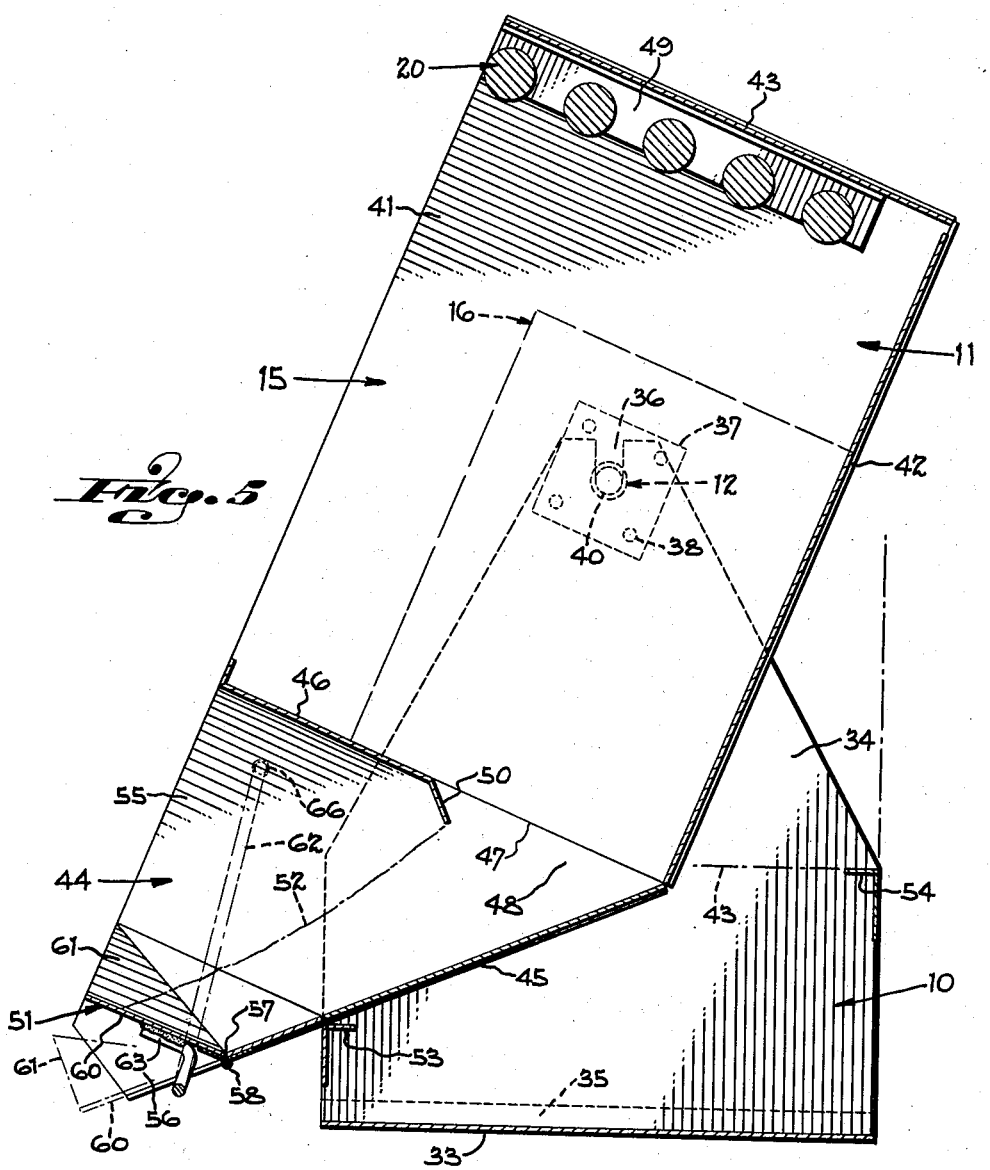
Figure 5 is an enlarged sectional view of the dispenser with the hopper in its inverted position corresponding to Figure 2.

The hopper 11 is fabricated from sheet metal and is preferably of welded construction (Figures 3 and 5). It comprises a pair of spaced side walls 41—41, a rear wall 42, an end wall 43, and a dispensing spout indicated generally at 44. The spout 44 is delineated by the outwardly inclined flow plate 45 joining rear wall 42, together with the end portions of the side walls 41 which have their edges joined to the flow plate 45. The open loading side 15 of the hopper faces the user, as viewed in Figure 2 in the dispensing position and faces the end of the loading conveyor 14 when the hopper is in upright loading position.

The hopper rollers 20 have their opposite ends journalled in angle irons 49—49 which are welded to the end wall 43 of the hopper. The upstanding flanges of the angle irons are spaced inwardly from the side walls 41 of the hopper as shown in Figure 3 to provide clearance for the projecting portions 39 of the roller shafts. The angle irons 49 preferably reside in axial alignment with the side rails when in loading position and, as stated earlier, the two conveyors preferably are flush with one another as shown in Figure 4 for convenient loading.

The containers 16 are advanced into the upright hopper upon the hopper rollers 20 with their upper ends open and shift by gravity (Figure 5) against the rear wall 42 as the hopper is rotated to inverted position. As the hopper is swung beyond a horizontal position and progressively begins to assume the downwardly inclined position, the container 16 slides gradually toward the stop plate 46, finally coming to rest against it as shown in broken lines (Figure 5). In this position, the open end 47 of the container communicates with the delivery opening 48 which is delineated by the inclined flow plate 45 and the lip 50 of the stop plate.

The parts thus flow by gravity down the inclined flow plate 45 toward the hinged gate, indicated generally at 51, which controls the flow of parts. The parts flowing from the open end of the container assume an angle of repose somewhat as indicated by the broken line 52 in Figure 5. In its dispensing position, the flow plate 45 engages the stop rail 53 which extends across the base as shown in Figure 5. When in its opposite upright position, the end wall 43 of the hopper rests upon a similar stop rail 54 at the opposite side of the base, as indicated in broken lines in Figure 5.

In its upright position, the hopper is slightly over-balanced toward the right and against stop rail 54, as viewed in Figure 4, since the common axis of the trunnions 12 is off-center toward the left. As the parts container is advanced into the hopper, the stop rail 54 resists any tendency of the hopper to rotate toward the right under the weight load of the container. When the hopper is loaded, and in upright position, major mass of the container is below the pivotal axis of the trunnions and a minor portion of the mass is located above the axis; therefore, the loaded hopper is stabilized by the stop rail 54 and may be pivoted toward its inverted position without excessive effort. As shown by the arrow in Figure 4, the last roller 26 of the loading conveyor is located rearwardly of the radius of swing of the hopper to prevent any interference with the swinging hopper.

It will be noted in Figure 5, that the parts container 16, upon shifting downwardly to the stop plate 46, over-balances the hopper in its inverted position against the stop rail 53. The over-balanced condition is increased by the parts which flow from the container down the flow plate 45 of the spout, as indicated by the broken line 52. In its inverted position therefore, a portion of the weight load of the hopper is carried by the trunnions 12 and another portion is carried by the stop rail 53, thus stabilizing the hopper in its inverted position.

Figure 2:
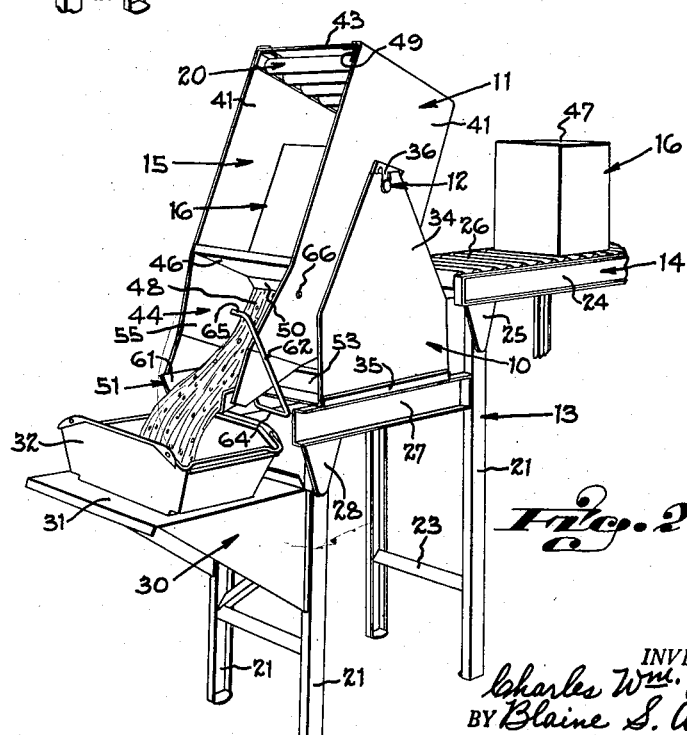
Figure 2 is a similar view showing the hopper in its inverted dispensing position.

Referring to Figures 2 and 3, side walls 55 of the spout extend from the hopper side walls and converge inwardly toward one another to join a pair of parallel outlet plates 56, which delineate an outlet passageway having a restricted width. As shown in Figure 5, the outer edge 57 of the flow plate 45 is located midway along the parallel outlet plates 56 and the hinged gate 51 is joined by the hinge 58 to the edge 57 of the flow plate. The gate thus is free to swing from the closed position shown in full lines in Figure 5 to the delivery position shown in broken lines.

The gate is formed of sheet metal and consists of a bottom plate 60 and triangular side plates 61 fitting between the parallel outlet plates 56. As shown in Figure 3, the side plates 61 of the gate diverge outwardly from the bottom plate with their free upper edges in sliding engagement with the surfaces of the parallel outlet plates 56. The swinging motion of the gate is regulated by a hand lever 62 having a foot 63 welded to the bottom plate 60 of the gate. The lever includes a right angular portion 64 extending laterally from the foot and across the edge of the outlet plate 56 to the lever proper. The swinging end of the lever includes a right angular latching finger 65 which, when the gate is in closed position (Figure 5) projects through an aperture 66 formed in the side wall 55 to lock the lever and gate in closed position. This prevents the flow of parts from the spout. The lever may be readily disengaged from its aperture by springing it outwardly from the side wall to withdraw its locking finger 65 from the aperture.

When the lever is swung to the position shown in Figure 2, after being unlocked, the gate may be swung downwardly, permitting the parts to flow by gravity down the flow plate 45 and across the bottom plate 60 of the gate into the receptacle 32. It will be noted that the bottom plate of the gate forms an endwise extension of the flow plate 45 when fully open, and that the rate of flow is conveniently increased or decreased by manipulating the lever 63 to vary the downward inclination of the gate. The flow is stopped entirely when the gate is in the closed position shown in Figure 5. It is locked in closed position by springing the lever outwardly then allowing the latch finger to snap into the locking aperture.

The side plates 61 of the gate, which engage the outlet plates 56 insure free operation of the gate by preventing any of the parts from catching between the gate and outlet plates, and also prevents any loss of parts. As the parts flow by gravity from the open gate, they are replaced by other parts flowing down the inclined flow plate. The angle of the inverted hopper and its container causes the parts to flow naturally until the supply is exhausted.

When the gate is locked in its closed position, it forms a barrier, creating a reservoir of parts in the open spout. The gate structure thus selectively adapts the dispenser to gravity feed or allows the parts to be dipped from the spout. When the gate lever is locked in its closed position, it forms a handle which may be used in tilting the hopper.

Modified structure

The dispenser shown in Figures 6, 7, and 8, is similar to the structure above described including the hopper conveyor rollers 20. The modified structure is intended for operations in which it is desired to dip out the parts, for example, in dispensing relatively large parts. In this event, one or more of the dispensers may be mounted along the assembly line or bench and refilled from a storage conveyor 14 as explained above.

As best shown in Figure 8, the modified hopper is provided with a parts retaining chute 67 in place of the flow control gate 51 previously described. The chute includes the upwardly curved plate 68 at its outer end which forms a barrier, creating a reservoir of parts, as indicated by the broken line 70. The parts are dipped from the retaining chute as needed and are replaced by other parts flowing from the container.

To regulate the gravity feed from the container, and to prevent the more flowable parts from over-running the curved barrier 68, the hopper includes the shiftable flow control plate 71. This plate is supported upon a fixed mounting plate 72 having opposite flanged edges 73 secured to the opposed side walls 41 of the hopper. The mounting plate 72 includes a pair of slots 69 traversed by respective adjustment screws 74 passing through the shiftable flow plate 71. Each screw has a wing nut 75 frictionally engaging the mounting plate on opposite sides of its slot. The shiftable plate 71 may be adjusted from the fully open position shown in full lines in Figure 8 to the closed position shown in broken lines, by loosening the wing nuts 75. The outer edge of the plate includes an upwardly turned flange 76 providing purchase when making the adjustment.

To facilitate handling, the hopper may be provided with the handles 77 and 78, handle 78 being in the form of a U-shaped bar projecting across the end of the retaining chute. The handle 77 is also formed of bar stock and is secured to the rear hopper wall at its juncture with the inclined flow plate. Handle 77 has a reduced width and provides a grip within reach of the operator to aid in pivoting the hopper from its upright to its inverted position. When fully inverted, the curved barrier 68 of chute 67 rests upon the stop rail 53 as shown in Figure 8. The outer edge of the chute is reinforced by the metal strip 80.

Having described our invention, we claim:

1. A dispenser arranged to dispense parts from a bulk container, said dispenser comprising a base, a hopper having a pair of side walls and an open face for receiving a parts container, said hopper having container support means at one end thereof and having a delivery spout projecting outwardly from an opposite end, said spout having an open face and having side walls joined to the side walls of the hopper, pivot means on the base and hopper cradling the hopper relative to the base for rocking motion selectively to an upright or a downwardly inclined inverted position, the open face of the hopper and spout facing upwardly in said inverted position, the said container support means residing at the lower end of said hopper when the hopper is pivoted to said upright position, whereby a bulk parts container may be advanced through said open face and upon said support means to be inverted with the hopper, stop means in said hopper adjacent the spout arranged to support the parts container in said inverted position, a second stop means on said base contacting the spout in said inverted position and stabilizing the hopper with the spout residing at the lower end of the hopper in a downwardly inclined position, whereby the parts flow by gravity from the bulk container and down the downwardly inclined spout, said spout having an open end extending beyond said base in said inverted dispensing position, a flow control gate pivotally mounted at the open end of the spout, said gate pivoting selectively to an upwardly inclined position across said downwardly inverted spout or to a downwardly inclined position corresponding at least partially to the downward inclination of the inverted spout, said gate having opposed side walls slidably interfitting the side walls of said spout, said gate in said upwardly inclined position creating a reservoir of parts to be dipped from the open face of the downwardly inclined spout, said gate in said downwardly inclined position adapting the parts to flow by gravity down the spout and across the gate.

2. A dispenser arranged to dispense parts from a bulk container, said dispenser comprising a base, a hopper having an open face for receiving a parts container, said hopper having container support means at one end thereof and having a delivery spout projecting outwardly from an opposite end, said spout having an open face, pivot means on the base and hopper cradling the hopper for rocking motion relative to the base selectively to an upright or downwardly inclined inverted position, the open face of the hopper and spout facing upwardly in said inverted position, the said container support means residing at the lower end of said hopper when the hopper is pivoted to said upright position, whereby a bulk parts container may be advanced through said open face and upon said support means to be inverted with the hopper, stop means in said hopper adjacent the spout arranged to support the container in said inverted position, a second stop means on said base contacting the spout in said inverted position and stabilizing the hopper with the spout residing at the lower end of the hopper in a downwardly inclined position, whereby the parts flow by gravity from the bulk container and down the spout, said spout having an open end extending beyond said base in said inverted dispensing position, a flow control gate pivotally mounted at the open end of the spout, an actuating lever connected to said gate, said gate pivoting selectively to an upwardly inclined position across said inverted spout or to a downwardly inclined position corresponding at least partially to the downward inclination of the inverted spout, said actuating lever having a latch portion projecting inwardly toward one side of the spout, said spout having an aperture engageable with said latch portion and latching said lever and gate in said upwardly inclined position and creating a reservoir of parts to be dipped from the open face of the downwardly inclined spout, said gate adapting the parts to flow by gravity down the spout and across the gate when in said downwardly inclined position.

3. A dispenser arranged to dispense parts from a bulk parts container, said dispenser comprising a base, a parts hopper having an open face for receiving a parts container, said hopper having a series of conveyor rollers rotatably journalled in one end thereof and having a delivery spout projecting outwardly at an end opposite said conveyor rollers, said spout having an open face joining the open face of the hopper, a pair of pivot pins projecting outwardly from the hopper at opposite sides thereof upon a common axis, said base rotatably journalling said pivot pins and cradling the hopper for rocking motion relative to the base selectively to an upright or inverted position, the open face of the hopper and spout facing upwardly in said inverted position, the conveyor rollers residing in the lower end of said hopper when the hopper is pivoted to said upright position, whereby a bulk parts container may be advanced through said open face and upon the conveyor rollers to be inverted with the hopper upon pivotal motion of the hopper to said inverted dispensing position, a stop element in said hopper arranged to support the parts container when the hopper is pivoted to said inverted position, stop means on said base contacting said spout in said inverted position and stabilizing the hopper with the delivery spout residing at the lower end of the hopper in a downwardly inclined position, said spout having an open end projecting outwardly beyond said base in said inverted position, whereby the parts flow by gravity from the container and down the delivery spout toward the open end thereof, a flow control gate pivotally mounted in said spout, said flow control gate pivoting selectively to an upwardly or downwardly inclined position, said gate in said upwardly inclined position forming a barrier across the open end of the spout and creating a reservoir of parts to be dipped from said open face of the spout, said gate in said downwardly inclined position being generally parallel with said downwardly inclined spout and providing a gravity flow of parts down the spout and across said gate.

4. A dispenser arranged to dispense parts from a bulk parts container, said dispenser comprising a base, a parts hopper having an open face for receiving a parts container, said hopper having a series of conveyor rollers rotatably journalled in one end thereof and having a delivery spout projecting outwardly at an end opposite said conveyor rollers, said spout having an open face joining the open face of the hopper, a pair of pivot pins projecting outwardly from the hopper at opposite sides thereof upon a common axis, said base rotatably journalling said pivot pins and cradling the hopper for rocking motion relative to the base selectively to an upright or inverted position, the open face of the hopper and spout facing upwardly in said inverted position, the conveyor rollers residing in the lower end of said hopper when the hopper is pivoted to said upright position, whereby a bulk parts container may be advanced through said open face and upon the conveyor rollers to be inverted with the hopper upon pivotal motion of the hopper to said inverted dispensing position, a stop element in said hopper arranged to support the parts container when the hopper is pivoted to said inverted position, stop means or said base contacting said spout in said inverted position and stabilizing the hopper with the delivery spout residing at the lower end of the hopper in a downwardly inclined position, said spout having an open end projecting outwardly beyond said base in said inverted position, whereby the parts flow by gravity from the container and down the delivery spout toward the outer end thereof, a flow control gate pivotally mounted at the open end of said spout and forming an endwise extension thereof, said flow control gate pivoting selectively to an upwardly or downwardly inclined position, said gate in said upwardly inclined position forming a barrier across the open end of the spout and creating a reservoir of parts to be dipped from said open face of the spout, said gate in said downwardly inclined position being generally parallel with said downwardly inclined spout and providing a gravity flow of parts down the spout and across the gate, a control lever connected to said gate for pivoting the gate selectively to said downwardly or upwardly inclined positions, and coacting latching means on said lever and spout for locking the gate in said upwardly inclined position.

5. A dispenser arranged to dispense parts from bulk containers stored upon a generally horizontal loading conveyor, said dispenser comprising, a dispenser base mounted adjacent an end of the loading conveyor, a parts hopper having an open face and having a series of conveyor rollers rotatably journalled in one end thereof, the hopper having a delivery spout at an end opposite said conveyor rollers, said spout having an open face joining the open face of the hopper, a pair of pivot pins projecting outwardly from the hopper at opposite sides thereof and residing upon a common axis, said base rotatably journalling said pivot pins and cradling the hopper for rocking motion upon the base selectively to an upright or downwardly inclined inverted dispensing position, the open face of the hopper and spout facing upwardly in said inverted position, the conveyor rollers of the hopper being disposed adjacent an end of the loading conveyor when in said upright position with said open face presented to the end of the loading conveyor for advancing a bulk container from said loading conveyor, through the open face of the hopper and upon the conveyor rollers thereof, stop means on said base engaging and supporting the hopper in said upright position with the conveyor rollers thereof aligned with the loading conveyor, the container in the hopper being confined loosely therein and being inverted with the hopper upon pivotal movement thereof to said inverted dispensing position, a second stop means on said base engaging the hoppers in said inverted position and stabilizing the same with the delivery spout residing at the lower end of the hopper in a downwardly inclined position, whereby the parts flow by gravity from the bulk container and down the delivery spout, said spout having an open end extending outwardly beyond the base in said inverted dispensing position, a flow control gate pivotally mounted at the open end of the delivery spout, said gate pivoting selectively to an upwardly inclined position across said inverted spout or to a downwardly inclined position corresponding at least partially to the downward inclination of the inverted spout, said gate forming a barrier obstructing the flow of parts from the spout when in said upwardly inclined position and creating a reservoir of parts to be dipped from the open face of the downwardly inclined spout, said gate adapting the parts to flow by gravity down the spout and across the gate when in said downwardly inclined position.

6. A dispenser arranged to dispense parts from bulk containers stored upon a generally horizontal loading conveyor, said dispenser comprising, a dispenser base mounted adjacent an end of the loading conveyor, a parts hopper having an open face and having a series of conveyor rollers rotatably journalled in one end thereof, the hopper having a delivery spout at an end opposite said conveyor rollers, said spout having an open face joining the open face of the hopper, a pair of pivot pins projecting outwardly from the hopper at opposite sides thereof and residing upon a common axis, said base rotatably journalling said pivot pins and cradling the hopper for rocking motion upon the base selectively to an upright or downwardly inclined inverted dispensing position, the open face of the hopper and spout facing upwardly in said inverted position, the conveyor rollers of the hopper being disposed adjacent an end of the loading conveyor when in said upright position with said open face presented to the end of the loading conveyor for advancing a bulk container from said loading conveyor, through the open face of the hopper and upon the conveyor rollers thereof, stop means on said base engaging and supporting the hopper in said upright position with the conveyor rollers thereof aligned with the loading conveyor, the container in the hopper being confined loosely therein and being inverted with the hopper upon pivotal movement thereof to said inverted dispensing position, a second stop means on said base engaging the hopper in said inverted position and stabilizing the same with the delivery spout residing at the lower end of the hopper in a downwardly inclined position, whereby the parts flow by gravity from the bulk container and down the delivery spout, said spout having an open end extending outwardly beyond the base in said inverted dispensing position, a flow control gate pivotally mounted at the open end of the delivery spout, an actuating lever secured to said gate, said gate pivoting selectively in response to movement of the lever from an upwardly inclined position across said inverted spout to a downwardly inclined position corresponding at least partially to the downward inclination of the inverted spout, said gate forming a barrier obstructing the flow of parts from the spout when in said upwardly inclined position and creating a reservoir of parts to be dipped from the open face of the downwardly inclined spout, said gate adapting the parts to flow by gravity down the spout and over the gate when in said downwardly inclined position, and coacting latch means on said spout and actuating lever for latching said gate in said upwardly inclined position.

References Cited in the file of this patent
UNITED STATES PATENTS

| 1,967,683 | Ostrander | July 24, 1934 |
| 2,755,001 | Doepke | July 17, 1956 |
| 2,758,732 | Herzon et al. | Aug. 14, 1956 |
| 2,794,575 | Hall | June 4, 1957 |